US008003813B2

(12) United States Patent
Wanasundara et al.

(10) Patent No.: US 8,003,813 B2
(45) Date of Patent: Aug. 23, 2011

(54) PROCESS FOR SEPARATING SATURATED AND UNSATURATED FATTY ACIDS

(75) Inventors: Udaya Nayanakantha Wanasundara, Saskatoon (CA); Roger Peterson, Clarks Grove, MN (US)

(73) Assignee: Pos Pilot Plant Corporation, Saskatchewan (CA)

( * ) Notice: Subject to any disclaimer, the term of this patent is extended or adjusted under 35 U.S.C. 154(b) by 0 days.

(21) Appl. No.: 11/624,064

(22) Filed: Jan. 17, 2007

(65) Prior Publication Data
US 2007/0299272 A1 Dec. 27, 2007

Related U.S. Application Data

(63) Continuation-in-part of application No. 11/475,596, filed on Jun. 27, 2006.

(51) Int. Cl.
 *C11B 7/00* (2006.01)
(52) U.S. Cl. .................. 554/186; 554/156; 554/174
(58) Field of Classification Search .................. 554/156, 554/174, 186
See application file for complete search history.

(56) References Cited

U.S. PATENT DOCUMENTS

| | | | | |
|---|---|---|---|---|
| 4,377,526 | A | | 3/1983 | Fujita et al. |
| 4,601,856 | A | * | 7/1986 | Suzuki et al. .................. 554/184 |
| 4,776,984 | A | | 10/1988 | Traitler et al. |
| 4,792,418 | A | | 12/1988 | Rubin et al. |
| 5,106,542 | A | * | 4/1992 | Traitler et al. ................. 554/186 |
| 5,525,126 | A | * | 6/1996 | Basu et al. ....................... 44/308 |
| 5,679,809 | A | * | 10/1997 | Bertoli et al. ................. 554/186 |
| 6,395,778 | B1 | | 5/2002 | Luthria |
| 2002/0026063 | A1 | * | 2/2002 | Luthria .......................... 554/174 |
| 2004/0209953 | A1 | * | 10/2004 | Wai Lee ......................... 514/547 |
| 2005/0085653 | A1 | * | 4/2005 | Garro et al. .................... 554/175 |
| 2005/0232956 | A1 | | 10/2005 | Bist et al. |
| 2006/0042158 | A1 | * | 3/2006 | Lee ................................. 44/605 |

FOREIGN PATENT DOCUMENTS

CA  2114422 A1  7/1994

OTHER PUBLICATIONS

Ballance, P.E. et al, "Paper Chromatography of Saturated and Unsaturated Fatty Acids", Department of Botany, University of Southampton, Feb. 25, 1958, vol. 69, pp. 632-640.*
Wanasundara, Udaya N., et al. "Concentration of omega 3-polyunsaturated fatty acids of seal blubbler oil by urea complexation: optimization of reaction conditions", Food Chemistry, 1999, pp. 41-49, vol. 65, Elsevier Science Ltd.
Wanasundara, Udaya N. "Marine Oils Stabilization, Structural Characterization and Omega-3 Fatty Acid Concentration", A thesis submitted to the School of Graduate Studies in partial fulfilment of the requirements for the degree of Doctor of Philosophy, Department of Biochemistry, Memorial University, Newfoundland, Canada, Oct. 1996, pp. 1-374.
Christie, W. W. "Isolation, separation, identification and structural analysis of lipids" Lipid Analysis, 1973, pp. 147-149 whole document.
Swern, D et al "Application of urea complexes in the purification of fatty acids, esters, and alcohols. Oleic acid and methyl oleate from olive oil" Journal of the American Oil Chemists Society, 1952, pp. 614-615 whole document.
Swern, D "Fatty Acids: their chemistry, properties, production and uses" Techniques of separation E: Urea complexes, Part 3, 1964, pp. 2309-2358 whole document.

* cited by examiner

*Primary Examiner* — Deborah D Carr
(74) *Attorney, Agent, or Firm* — Scott D. Rothenberger; Fulbright & Jaworski LLP

(57) ABSTRACT

A process for separating a blend of saturated and unsaturated fatty acids or saturated and unsaturated fatty acid alky esters into a first fraction enriched with the saturated fatty acids or saturated fatty acid alkyl esters and a second fraction enriched with unsaturated fatty acids or unsaturated fatty acid alkyl esters. When separating fatty acids, the process includes the steps of (a) saponifying a blend of long chain saturated and unsaturated fatty acids to form free fatty acids, (b) complexing the free fatty acids with urea, and (c) separating the urea complexed free fatty acids into a first fraction enriched with saturated free fatty acids and a second fraction enriched with unsaturated free fatty acids. When separating fatty acid alkyl esters, the process includes the steps of (i) complexing the fatty acid alkyl esters with urea, and (ii) separating the urea-complexed fatty acid alkly esters into a first fraction enriched with saturated fatty acid alkyl esters and a second fraction enriched with unsaturated fatty acid alkyl esters.

45 Claims, No Drawings

PROCESS FOR SEPARATING SATURATED AND UNSATURATED FATTY ACIDS

CROSS-REFERENCE TO RELATED APPLICATION

This application is a continuation-in-part of my prior application Ser. No. 11/475,596, filed Jun. 27, 2006, currently pending.

FIELD OF THE INVENTION

This invention relates to separation of saturated and unsaturated fatty acids. More particularly, this invention relates to enrichment of unsaturated fatty acids and unsaturated fatty acid alky esters separated from plant, animal and marine oils.

BACKGROUND

Biodiesel is an alternative fuel for diesel engines that is produced by the transesterification of oils and fats from plant and animal sources, commonly rapeseed oil and soy oil. The transesterification process combines the oils and/or fats with an alcohol to produce organic esters, with glycerin produced as a byproduct of the reaction. These organic esters as known as biodiesel. Biodiesel is a nontoxic, biodegradable and renewable alternative to traditional diesel fuel produced from crude oil. Biodiesel also tends to produce lower emissions of carbon monoxide in most engines.

The accelerating worldwide demand for energy is driving an ever expanding search for alternative energy sources, including the search for improved processes and methods for producing biodiesel.

One of the drawbacks associated with the use of traditional biodiesel fuel in the gelling of biodiesel at cold temperatures such as those commonly encountered in the northern portion of the United States and Canada during the winter.

Accordingly, a need also exists for a cold-tolerant biodiesel fuel.

SUMMARY OF THE INVENTION

A first aspect of the invention is a process for separating a blend of saturated and unsaturated fatty acids, such as found in plant, animal and marine oils, into a first fraction enriched with saturated fatty acids and depleted of unsaturated fatty acids and a second fraction enriched with unsaturated fatty acids and depleted of saturated fatty acids. The process includes the steps of (a) saponification or esterification of a blend of long chain saturated and unsaturated fatty acids (i.e. plant, animal or fish oils) to form free fatty acids or fatty acid alkyl esters, (b) complexing the free fatty acids or alkyl esters with urea, and (c) separating the urea complexed free fatty acids or fatty acid alkyl esters into a first fraction and a second fraction wherein the first fraction is enriched with saturated free fatty acids or saturated fatty acid alkyl esters and depleted of unsaturated free fatty acids or unsaturated fatty acid alkyl esters and the second fraction is enriched with unsaturated free fatty acids or unsaturated fatty acid alkyl esters and depleted of saturated free fatty acids or saturated fatty acid alkyl esters.

The unsaturated free fatty acids in the second fraction separated from certain plant oils as exemplified by soy oil, rape seed oil and palm oil may be transesterified to form fatty acid alkyl esters suitable for use as a cold-tolerant biodiesel fuel. Furthermore, the process of the present invention provides methods for forming enriched omega-3 fatty acids and enriched omega-3 fatty acid alkyl esters from certain plant sources as exemplified by borage and flax, from marine oils as exemplified by seal oils and fish oils, and from animal sources as exemplified by beef tallow.

A second aspect of the invention is a process for separating a blend of saturated and unsaturated fatty acid alkyl esters, such as found in transesterified soy oil, into a first fraction enriched with saturated fatty acid alkyl esters and depleted of unsaturated fatty acid alkyl esters and a second fraction enriched with unsaturated fatty acid alkyl esters and depleted of saturated fatty acid alkyl esters. The process includes the steps of (a) complexing the fatty acid alkyl esters with urea, and (b) separating the urea complexed fatty acid alkyl esters into a first fraction and a second fraction wherein the first fraction is enriched with saturated fatty acid alkyl esters and depleted of unsaturated fatty acid alkyl esters and the second fraction is enriched with unsaturated fatty acid alkyl esters and depleted of saturated fatty acid alkyl esters.

DETAILED DESCRIPTION OF THE INVENTION

Definitions and Acronyms

As utilized herein, including the claims, the term "depleted" means lessened in quantity or content.

As utilized herein, including the claims, the term "enriched" means increased in quantity or content.

As utilized herein, including the claims, the term "selective" means to take by preference so as to increase the percentage of the selected object(s), item(s) or thing(s) in the selected portion.

| ACRONYM | DESCRIPTION |
| --- | --- |
| FFA | Free Fatty Acid |
| SFFA | Saturated Free Fatty Acid |
| UFFA | Unsaturated Free Fatty Acid |
| PUFFA | Polyunsaturated Free Fatty Acid |
| FAME | Fatty Acid Methyl Ester |
| SFAME | Saturated Fatty Acid Methyl Ester |
| UFAME | Unsaturated Fatty Acid Methyl Ester |
| FAEE | Fatty Acid Ethyl Ester |
| SFAEE | Saturated Fatty Acid Ethyl Ester |
| UFAEE | Unsaturated Fatty Acid Ethyl Ester |
| ALA | Alpha-Linolenic Acid |
| GLA | Gamma-Linolenic Acid |

The Process The first aspect of the invention is a process for separating a blend of saturated and unsaturated fatty acids into a first fraction enriched with saturated fatty acids and depleted of unsaturated fatty acids and a second fraction enriched with unsaturated fatty acids and depleted of saturated fatty acids. The blend of saturated and unsaturated fatty acids may be obtained from various known plant and animal sources as exemplified by rapeseed oil, soy oil, palm oil, borage oil, flax oil, primrose oil, seal oil and fish oil among others.

Separation of the saturated fatty acids from the unsaturated fatty acids can be achieved by complexing a blend of the fatty acids with urea. Urea has been found to selectively complex saturated fatty acids relative to unsaturated fatty acids, creating a saturated fatty acid-enriched solids fraction and an unsaturated fatty acid-enriched liquid fraction. The solvent of choice for use in this step of the process is a $C_{1-3}$ alcohol with or without water at a weight ratio of at least about 2:1 solvent to urea, preferably about 3:1 to 10:1, most preferably about 4:1 to 5:1. A weight ratio of less than about 2:1 tends to result in incomplete complexation of the unsaturated fatty acids while a weight ratio in excess of about 10:1 increases processing cost without a concomitant increase in yield or processability. Urea should be employed at a weight ratio of at least 1:1 urea to fatty acid, preferably at a weight ratio of about 2:1 to 5:1, most preferably about 3:1. A weight ratio of less than about 1:1 tends to result in incomplete complexation of the fatty acids while a weight ratio in excess of about 5:1 increases processing cost without a concomitant increase in yield or separation efficiency.

Separation of the saturated fatty acid-enriched solids fraction and unsaturated fatty acid-enriched liquid fraction can be achieved by any of the well-known solid-liquid separation techniques. Suitable processes and systems include specifically, but not exclusively, decantation, countercurrent decantation, gravity sedimentation, filtration, expression, centrifugation and combinations thereof. The preferred method is filtration.

An enhanced recovery of unsaturated free fatty acids can be achieved by recovering residual unsaturated free fatty acids contained in the saturated free fatty acid enriched solids fraction by any suitable technique know to those of skill in the art, including chromatography, and combining the recovered residual unsaturated free fatty acids with the originally recovered unsaturated free fatty acid enriched fraction for further processing.

The unsaturated fatty acid-enriched liquid fraction can be washed with water acidified to a pH of about 3-4, followed by separation of the resultant aqueous and oil phases, to remove impurities.

When oil is used as the starting source of blended saturated and unsaturated fatty acids, the oil is preferably saponified prior to treatment with urea. Saponification of the oil frees the fatty acids contained in the oil so as to increase availability of the fatty acids for complexing with urea. Saponification can be achieved by adding a suitable solvent to the oil, such as a short chain alcohol with water, and a hydrolyzing reagent such as lye or other caustic. The solvent of choice for use in this step of the process is a $C_{1-3}$ alcohol with water at a weight ratio of at least about 2:1 solvent to oil, preferably about 2:1 to 10:1, most preferably about 3:1 to 4:1. A weight ratio of less than about 2:1 tends to result in incomplete saponification of the unsaturated fatty acids while a weight ratio in excess of about 10:1 increases processing cost without a concomitant increase in yield or processability. In a preferred embodiment a majority of the $C_{1-3}$ alcohol is recycled alcohol recovered from the process. The caustic, such as NaOH, should be employed at a weight ratio of at least 1:20 caustic to oil, preferably at a weight ratio of about 2:10 to 5:10, most preferably about 3:10. A weight ratio of less than about 1:20 tends to result in incomplete saponification of the unsaturated fatty acids while a weight ratio in excess of about 1:20 increases processing cost without a concomitant increase in saponification yield or efficiency.

The saponified oil can then be separated by any suitable separation technique into a glycerine enriched fraction, a free fatty acid enriched fraction and a waste fraction containing the solvent and other constituents from the oil. Suitable separation techniques include any of the well-known techniques for separating such organic liquid-liquid systems including centrifugation, decantation and distillation. A preferred technique includes acidification of the mixture, preferably below a pH of 6, with a suitable acid, such as sulfuric acid or citric acid, followed by centrifugation. The glycerine enriched fraction can be redirected for further processing into commercially saleable glycerine. The waste fraction can be redirected for solvent recovery and recycle.

The unsaturated fatty acids in the unsaturated fatty acid-enriched liquid fraction can then be transesterified in accordance with any of the well known techniques for transesterification of fatty acids to produce biodiesel.

The resultant unsaturated fatty acid alkyl esters can be washed with water acidified to a pH of about 3-5, followed by separation of the resultant aqueous and oil phases, to remove impurities.

The second aspect of the invention is a process for separating a blend of saturated and unsaturated fatty acid alkyl esters into a first fraction enriched with saturated fatty acid alkyl esters and depleted of unsaturated fatty acid alkyl esters and a second fraction enriched with unsaturated fatty acid alkyl esters and depleted of saturated fatty acid alkyl esters. The blend of saturated and unsaturated fatty acid alkyl esters may be obtained by traditional transesterification of various known plant and animal sources as exemplified by rapeseed oil, soy oil, palm oil, borage oil, flax oil, primrose oil, seal oil and fish oil among others. It is to be noted that the second aspect of the present invention may also use as a starting material, conventional biodiesel produced with various prior art methods.

As with the first aspect of the invention, separation of the saturated fatty acid alkyl esters from the unsaturated fatty acid alkyl esters can be achieved by complexing a blend of the fatty acid alkyl esters with urea. As with the first aspect of the invention, the solvent of choice for use in this step of the process is a $C_{1-3}$ alcohol with or without water at a weight ratio of at least about 2:1 solvent to urea, preferably about 3:1 to 10:1, most preferably about 4:1 to 5:1. A weight ratio of less than about 2:1 tends to result in incomplete complexation of the unsaturated fatty acid alky esters while a weight ratio in excess of about 10:1 increases processing cost without a concomitant increase in yield or processability. Urea should be employed at a weight ratio of at least 1:1 urea to fatty acid ester, preferably at a weight ratio of about 2:1 to 5:1, most preferably about 3:1. A weight ratio of less than about 1:1 tends to result in incomplete complexation of the fatty acid esters while a weight ratio in excess of about 5:1 increases processing cost without a concomitant increase in yield or separation efficiency.

Again, as with the first aspect of the invention, separation of the saturated fatty acid alkyl ester-enriched solids fraction and unsaturated fatty acid alkyl ester-enriched liquid fraction can be achieved by any of the well-known solid-liquid separation techniques. Suitable processes and systems include specifically, but not exclusively, decantation, countercurrent decantation, gravity sedimentation, filtration, expression, centrifugation and combinations thereof. The preferred method is filtration.

An enhanced recovery of unsaturated fatty acid alkyl esters can be achieved by recovering residual unsaturated fatty acid alkyl esters contained in the saturated fatty acid alkyl ester enriched solids fraction by any suitable technique know to those of skill in the art, including chromatography, and combining the recovered residual unsaturated fatty acid alkyl esters with the originally recovered unsaturated fatty acid alkyl enriched fraction for further processing.

The unsaturated fatty acid alkyl ester-enriched liquid fraction can be washed with water acidified to a pH of about 3-4, followed by separation of the resultant Aqueous and oil phased, to remove impurities.

EXAMPLES

Example 1

Separation of Soy Oil

Into a reaction vessel is introduced 1,000 grams of refined soy oil, 180 grams of powdered sodium hydroxide, 440 grams of water and 2,100 grams of ethanol (95% by weight) to form a first admixture. The first admixture is agitated for 1.5 hours at 60° to 65° C. after which the first admixture cooled to approximately 25° C., an additional 2,000 grams of water is introduced, and sufficient acid is added to adjust the pH of the first admixture to 2 to 3.

The cooled first admixture is separated by a three way centrifuge into a glycerine-enriched fraction, a FFA-enriched fraction and a waste fraction containing ethanol (95% by weight), water, acid and the sodium salt formed as the reaction product of the sodium hydroxide and acid. The glycerine-enriched fraction is redirected for further processing into commercially saleable glycerine. The waste fraction is redirected for recovery and recycle.

The FFA-enriched fraction is introduced into a second reaction vessel. A sufficient amount of urea, dissolved in ethanol (95% by weight) is added to the FFA-enriched fraction on the second reaction vessel at a urea to FFA ratio of 1:1 (w/w) and a urea to solvent concentration of 40% (w/v) to form a second admixture. The second admixture is blended together and then allowed to stand for four hours at 20° C. The second admixture is then filtered to produce an UFFA-enriched filtrate and a SFFA-enriched retentate containing SFFA and urea.

The SFFA-enriched retentate is introduced into a first mixing vessel along with 40,000 grams of water to form a third admixture. The third admixture is blended together at 60° C. until the urea is fully dissolved. The third admixture is then separated by centrifugation into an aqueous phase containing the urea, and an oil phase containing the SFFA. The aqueous phase is redirected for recovery and recycle.

The oil phase is washed with acidified water and the washed SFFAs separated by chromatography to produce myristic acid, palmitic acid, stearic acid, oleic acid and additional recovered UFFAs.

The UFFA-enriched filtrate is washed twice with acidified water (pH 3-4) and dried.

The dried UFFA-enriched filtrate and the additional recovered UFFAs are introduced into a third reaction vessel along with 400 grams of absolute ethanol and 50 grams of sulfuric acid to form a fourth admixture. The fourth admixture is agitated at room temperature for 1-2 hours until transesterification of the UFFAs is complete. Crude FAMEs are recovered from the fourth admixture and washed with a 10 wt % aqueous solution of sodium chloride at 50° to 60° C. The washed FAMEs are separated from the wash water by centrifugation and stored.

Example 2

Separation of Transesterified Soy Oil

Into a reaction vessel is introduced 140 grams of fatty acid methyl esters obtained by transesterification of soy oil, and 390 grams of urea dissolved in 200 grams of ethanol (95% by weight) to form a first admixture. The first admixture is blended together and then allowed to stand for four hours at 20° C. The first admixture is then filtered to produce an UFAME-enriched filtrate and a SFAME-enriched solids containing SFAME and urea.

The SFAME-enriched solids is introduced into a first mixing vessel along with 450 grams of water to form a second admixture. The second admixture is blended together at 60° C. until the urea is fully dissolved. The second admixture is then separated by centrifugation into an aqueous phase containing the urea, and an oil phase containing the SFAME. The aqueous phase is redirected for recovery and recycle.

The oil phase is washed with acidified water and the washed SFAMEs separated by chromatography to produce purified methyl esters of myristic acid, palmitic acid, stearic acid, oleic acid and additional recovered UFAMEs.

The UFAME-enriched filtrate is washed twice with acidified water (pH 3-4) and stored.

Example 3

Transesterification and Separation of Flax Oil

Into a reaction vessel was introduced 200 grams of flax oil comprising 57.21% ALA, 36 grams of powdered sodium hydroxide, 90 grams of water and 530 grams of ethanol (95% by weight) to form a first admixture. The first admixture was agitated for 1.5 hours at 60° to 65° C. after which the first admixture was cooled to approximately 25° C.

Unsaponifiable matter was removed by first adding 400 grams of water to the cooled first admixture, then introducing and mixing 100 ml of hexane with the diluted cooled first admixture which resulted in separation of the first admixture into a first aqueous fraction and a hexane waste fraction containing unsaponifiable matter. The aqueous fraction was washed a second time to remove any remaining unsaponifiable matter by mixing a second aliquot of 100 ml of hexane with the first aqueous fraction followed by separation into a second aqueous fraction and a hexane waste fraction containing unsaponifiable matter. The two hexane waste fractions were combined for recovery and recycling of the hexane from the unsaponifiable matter. The recovered unsaponifiable matter may be further processed to remove useful products therefrom.

Sufficient 3N hydrochloric acid was added to adjust the pH of the second aqueous fraction about 3.5 after which the acidified second aqueous fraction was separated into a flax FFA-enriched oil fraction and an aqueous waste fraction containing ethanol (95% by weight). The aqueous waste fraction may be further processed to recover and recycle the ethanol therefrom.

Three ratios of flax FFA-enriched fraction and urea were complexed together and then further processed to assess the effects of different FFA/urea combinations on enrichment of unsaturated free fatty acids as follows. Into a second reaction vessel was added 237.5 ml of 95% ethanol plus 12.5 ml water plus 100 g urea and then mixed at about 50° C. thereby producing a reaction solution comprising 40% urea in 95% ethanol (w/v). Into a third reaction vessel was added 118.75 ml of 95% ethanol plus 6.25 ml water plus 50 g urea and then mixed at about 50° C. thereby producing a reaction solution comprising 40% urea in 95% ethanol (w/v). Into a fourth reaction vessel was added 356.25 ml of 95% ethanol plus 18.75 ml water plus 150 g urea and then mixed at about 50° C. thereby producing a reaction solution comprising 40% urea in 95% ethanol (w/v). Into each of the second, third and fourth reaction vessels was added 25 g of the flax FFA-enriched thereby producing urea:flax FFA ratios of 2:1; 4:1; and 6:1 respectively. Each of the solutions in the second, third and fourth reaction vessels was mixed together and then allowed to stand for about four hours at ambient room temperature (i.e., in the range of 18° C. to 28° C.) during which time the SFFA crystallized with urea and settled out of the reaction solution. The admixtures in each of the second, third and fourth reaction vessels were then filtered to produce a first, a second and a third UFFA-enriched filtrate respectively and a first, a second and a third SFFA-enriched retentate respectively.

95% alcohol was separated from each of the first, second and third UFFA-enriched filtrates by evaporation thereby providing a first, a second and a third UFFA-enriched oil fraction. Each of the UFFA-enriched oil fractions was washed twice with 100 ml acidified water (pH 3-4) and then dried thereby producing a first enriched UFFA faction comprising 79.01% ALA, a second enriched UFFA faction comprising 79.26% ALA, and a third enriched UFFA fraction comprising 80.02% ALA.

Example 4

Transesterification and Separation of Borage Oil

Into a first reaction vessel was introduced 1,000 grams of RBD borage oil comprising 23.3% GLA, after which a vacuum was applied to the first reaction vessel while the oil was heated to and maintained at 100° C. for 30 minutes until all residual water was removed from borage oil thereby drying the borage oil, after which, the dried borage oil was cooled to 60° C. While the borage oil was being dried, 10 grams of potassium hydroxide (KOH) crystals were added into 634 grams of absolute ethanol and mixed until complete dissolution was achieved. The KOH/ethanol solution was transferred into the dried cooled RBD borage oil to form a first admixture and mixed for 2 hours at 60° C., after which, the first admixture was allowed to settle into a FAEE-enriched upper oil fraction and a glycerine-enriched lower ethanol fraction. The glycerine-enriched lower ethanol fraction was separated from the FAEE-enriched upper fraction. The glycerine-enriched ethanol fraction was redirected for recovery and recycling of the ethanol, and for further processing of the glycerine into commercially salable forms.

The FAEE-enriched fraction was washed twice by adding an equal weight of warm water, mixing well and then allowing the mixture to settle into an upper FAEE-enriched phase and a lower aqueous phase after which, the lower aqueous phase was removed. The washed FAEE-enriched fraction was then dried under vacuum to remove all residual water. The GLA content of the dried FAEE fraction was 23.4%.

The RBD borage dried FAEE fraction was complexed with urea to enrich the GLA content as follows. First, 200 grams of urea were added to 600 grams of 95% ethanol and stirred at 50° C. until completely dissolved thereby producing a urea: 95% ethanol ratio of 1:3 (w/w). Then, 100 grams of the dried borage FAEE fraction prepared from the first admixture were added to the urea-95% ethanol solution thereby producing a second admixture which was mixed at ambient room temperature (i.e., in a range of 18° C. to 28° C.) for a 2-hour period during which time, SFAEE present in the FAEE fraction crystallized with urea and settled out of the reaction solution. The second admixture was then filtered to produce a UFAEE-enriched filtrate and a SFAEE-enriched retentate containing SFAEE and urea.

The ethanol was separated from the UFAEE-enriched filtrate by evaporation thereby providing a UFAEE-enriched oil fraction. The UFAEE-enriched oil fraction was washed twice with 500 ml acidified water (pH 4-5) and then dried thereby producing an enriched UFAEE faction comprising 52.3% GLA.

Example 5

Transesterification and Separation of Seal Oil

Into a first reaction vessel was introduced 2,000 grams of seal oil comprising 20.0% of omega-3 fatty acids, after which a vacuum was applied to the first reaction vessel while the oil was heated to and maintained at 100° C. for 30 minutes until all residual water was removed thereby drying the seal oil after which, the dried seal oil was cooled to 60° C. While the seal oil was being dried, 20 grams of potassium hydroxide (KOH) crystals were added into 614 grams of absolute ethanol and mixed until complete dissolution was achieved. The KOH/ethanol solution was transferred into the dried cooled seal oil to form a first admixture and mixed for 2 hours at 60° C., after which, the first admixture was allowed to settle into a seal oil FAEE-enriched upper oil fraction and a glycerine-enriched lower ethanol fraction. The glycerine-enriched lower ethanol fraction was separated from the seal oil FAEE-enriched upper fraction. The glycerine-enriched ethanol fraction was redirected for recovery and recycling of the ethanol, and for further processing of the glycerine into commercially salable forms.

Equal amounts of seal oil FAEE-enriched fraction were introduced into a second reaction vessel and third reaction vessel. A sufficient amount of urea, dissolved in ethanol (95% by weight) was added to the seal oil FAEE-enriched fraction in the second reaction vessel at a urea to FAEE ratio of 4:1 (w/w) and a urea to solvent concentration of 40% (w/v) to form a second admixture. A sufficient amount of urea, dissolved in ethanol (95% by weight) was added to the seal oil FAEE-enriched fraction in the third reaction vessel at a urea to FAEE ratio of 3:1 (w/w) and a urea to solvent concentration of 40% (w/v) to form a third admixture. The second and third admixtures were separately and individually well mixed and then allowed to stand for twenty hours at 20° C. The second and third admixtures were then individually and separately filtered to produce a first and second UFAEE-enriched filtrates and a first and second SFAEE-enriched retentates containing SFAEE and urea.

The ethanol was separated from each UFAEE-enriched filtrate by evaporation thereby providing a first and a second UFAEE-enriched oil fraction. The UFAEE-enriched oil fraction was washed twice with acidified water (pH 3-4) and then dried under vacuum to remove all residual water. A comparison of the omega-3 fatty acid esters in the starting seal oil and the first and second UFAEE-enriched oil fractions produced therefrom as disclosed herein is shown in Table 1.

TABLE 1

Omega-3 fatty acid content and composition in seal oil and in enriched unsaturated ethyl esters produced therefrom.

| Fatty acid | Seal oil (% of total) | First UFAEE-enriched oil fraction (% of total) | First UFAEE-enriched oil fraction (% of total) |
|---|---|---|---|
| Eicosapentaenoic acid | 7.0 | 30.1 | 32.4 |
| Docosapentaenoic acid | 4.2 | 7.0 | 5.9 |
| Docosahexaenoic acid | 8.8 | 32.5 | 35.1 |
| Total Omega-3 FA | 20.0 | 69.6 | 73.4 |

While particular exemplary embodiments of the present invention have been described in the foregoing, it is to be understood that other embodiments are possible within the scope of the present invention and are intended to be included herein. In view of numerous changes and variations that will be apparent to persons skilled in the art, the scope of the present invention is to be considered limited solely by the appended claims.

We claim:

1. A process, consisting of the steps:
   (a) saponifying an oil comprising a blend of long chain saturated and unsaturated fatty acids to form a first admixture comprising free fatty acids wherein said oil is saponified by admixing the oil with a $C_{1-3}$ alcohol or a combination of a $C_{1-3}$ alcohol and water at an elevated temperature of about 60° C. to about 65° C. in the presence of an alkali catalyst;

(b) separating the free fatty acids from the first admixture;

(c) complexing the free fatty acids with urea dissolved in a $C_{1-3}$ alcohol or a combination of a $C_{1-3}$ alcohol and water at an elevated temperature of about 60° C. to about 65° C. to form a second admixture comprising urea-complexed free fatty acids;

(d) cooling the second admixture to room temperature to precipitate urea-complexed saturated free fatty acids therein; and (e) separating the urea-complexed free fatty acids into a first fraction and a second fraction wherein the first fraction is enriched with saturated free fatty acids and depleted of unsaturated free fatty acids and the second fraction is enriched with unsaturated free fatty acids and depleted of saturated free fatty acids.

2. The process of claim 1 wherein the process further comprises transesterification of the second fraction to form long chain unsaturated fatty acid alkyl esters suitable for use as a cold-tolerant biodiesel fuel.

3. The process of claim 1 wherein the $C_{1-3}$ alcohol is ethanol and a majority of the ethanol is recycled ethanol recovered from the process.

4. The process of claim 1 further comprising the steps of (i) adjusting the pH of the first admixture below 6 by the addition of an acid after saponification of the blend of long chain saturated and unsaturated fatty acids, and (ii) recovering a free fatty acid enriched fraction and a glycerine enriched fraction from the pH adjusted first admixture wherein the recovered free fatty acid enriched fraction is the source of free fatty acids complexed with urea in step (b).

5. The process of claim 1 wherein cooling the second admixture comprising urea-complexed free fatty acids forms a saturated free fatty acid enriched solids fraction and an unsaturated free fatty acid enriched liquids fraction.

6. The process of claim 5 wherein the step of separating the urea complexed free fatty acids into a first fraction and a second fraction comprises the step of separating the solids fraction and the liquids fraction.

7. The process of claim 6 wherein the solids fraction and the liquids fraction are separated by filtration or centrifugation.

8. The process of claim 1 further comprising the step of separating residual unsaturated free fatty acids in the first fraction from the saturated free fatty acids in the first fraction to obtain additional unsaturated free fatty acids.

9. The process of claim 8 further comprising the step of transesterification of the additional unsaturated free fatty acids to form long chain unsaturated fatty acid alkyl esters suitable for use as a cold-tolerant biodiesel fuel.

10. The process of claim 8 wherein the additional unsaturated free fatty acids are separated from the saturated free fatty acids in the first fraction by chromatography.

11. The process of claim 2 wherein the alkyl esters are ethyl esters.

12. The process of claim 1, further comprising the step of transesterification of the additional unsaturated free fatty acids to form long chain unsaturated fatty acid alkyl esters suitable for use as enriched omega-3-fatty acids.

13. The process of claim 1 wherein the blend of long chain saturated and unsaturated fatty acids is an oil selected from the group consisting of plant oils, animal oils, fish oils, marine mammal oils, waste cooking oils, and microbial oils.

14. The process of claim 13 wherein the process further comprises transesterification of the second fraction to form long chain unsaturated fatty acid alkyl esters.

15. The process of claim 14 wherein the alkyl esters are ethyl esters.

16. The process of claim 13 wherein the blend of long chain saturated and unsaturated fatty acids is a plant oil selected from the group consisting of black currant seed oil, borage oil, camelina oil, canola oil, castor oil, chia oil, corn oil, cotton seed oil, cuphea oil, flax oil, hemp oil, jojoba oil, mustard oil, olive oil, palm oil, peanut oil, primrose oil, rapeseed oil, safflower oil, sesame oil, soy oil, sunflower oil and tree nut oils.

17. The process of claim 8 further comprising the step of transesterification of the additional unsaturated free fatty acids to form long chain unsaturated fatty acid alkyl esters.

18. A process of producing cold-tolerant biodiesel fuel, comprising:

(a) saponifying a blend of long chain saturated and unsaturated fatty acids to form free fatty acids, (b) complexing the free fatty acids with urea, (c) removing the saturated free fatty acids from the urea complexed blend of free fatty acids, leaving a fraction containing the unsaturated free fatty acids, and (d) transesterifying the fraction containing the unsaturated free fatty acids to form long chain unsaturated fatty acid alkyl esters suitable for use as a cold-tolerant biodiesel fuel.

19. The process of claim 18 wherein the blend of long chain saturated and unsaturated fatty acids is soy oil.

20. The process of claim 19 wherein the soy oil is saponified by admixing the soy oil with a $C_{1-3}$ alcohol or a combination of a $C_{1-3}$ alcohol and water at an elevated temperature of 60 to 65° C. in the presence of an alkali catalyst to form a first admixture.

21. The process of claim 20 wherein the $C_{1-3}$ alcohol is ethanol and a majority of the ethanol is recycled ethanol recovered from the process.

22. The process of claim 21 further comprising the steps of (i) adjusting the pH of the first admixture below 6 by the addition of an acid after saponification of the soy oil, and (ii) recovering a free fatty acid enriched fraction and a glycerine enriched fraction from the pH adjusted first admixture wherein the recovered free fatty acid enriched fraction is the source of free fatty acids complexed with urea in step (b).

23. The process of claim 18 wherein the free fatty acids are complexed with urea by admixing the free fatty acids with urea dissolved in a $C_{1-3}$ alcohol or a combination of a $C_{1-3}$ alcohol and water to form a second admixture.

24. The process of claim 18 wherein complexation of the free fatty acids with urea forms a saturated free fatty acid enriched solids fraction and an unsaturated free fatty acid enriched liquids fraction.

25. The process of claim 24 wherein the step of removing the saturated free fatty acids from the urea complexed blend of free fatty acids comprises the step of separating the solids fraction and the liquids fraction.

26. The process of claim 25 wherein the solids fraction and the liquids fraction are separated by filtration.

27. The process of claim 18 further comprising the step of separating residual unsaturated free fatty acids from the removed saturated free fatty acids to obtain additional unsaturated free fatty acids.

28. The process of claim 27 further comprising the step of transesterification of the additional unsaturated free fatty acids to form long chain unsaturated fatty acid alkyl esters suitable for use as a biodiesel fuel.

29. The process of claim 27 wherein the residual unsaturated free fatty acids are separated from the removed saturated free fatty acids by chromatography.

30. The process of claim 18 wherein the alkyl esters are ethyl esters.

31. A process of producing cold-tolerant biodiesel fuel, comprising:
(a) complexing a blend of long chain saturated and unsaturated fatty acid alkyl esters with urea, and
(b) removing the saturated fatty acid alkyl esters from the urea complexed blend of free fatty acid alkyl esters, leaving a fraction containing the unsaturated fatty acid alkyl esters, whereby the fraction containing the unsaturated fatty acid alkyl esters is suitable for use as a cold-tolerant biodiesel fuel.

32. The process of claim 31 wherein the blend of long chain saturated and unsaturated fatty acid alkyl esters is transesterified soy oil.

33. The process of claim 31 wherein the fatty acid alkyl esters are complexed with urea by admixing the fatty acid alkyl esters with urea dissolved in a $C_{1-3}$ alcohol or a combination of a $C_{1-3}$ alcohol and water to form a first admixture.

34. The process of claim 31 wherein complexation of the fatty acid alkyl esters with urea forms a saturated fatty acid alkyl ester solids fraction and an unsaturated fatty acid alkyl ester enriched liquids fraction.

35. The process of claim 34 wherein the step of removing the saturated fatty acid alkyl esters from the urea complexed blend of fatty acid alky esters comprises the step of separating the solids fraction and the liquids fraction.

36. The process of claim 35 wherein the solids fraction and the liquids fraction are separated by filtration.

37. The process of claim 31 further comprising the step of separating residual unsaturated free fatty acid alkyl esters from the removed saturated free fatty acid alkyl esters to obtain additional unsaturated free fatty acid alkyl esters.

38. The process of claim 37 wherein the residual unsaturated free fatty acid alkyl esters are separated from the removed saturated free fatty acid alkyl esters by chromatography.

39. The process of claim 31 wherein the fatty acid alkyl esters are fatty acid ethyl esters.

40. The process of claim 18 wherein the blend of long chain saturated and unsaturated fatty acids is an oil selected from the group consisting of plant oils, animal oils, fish oils and marine mammal oils.

41. The process of claim 40 wherein the oil is saponified by admixing the oil with a $C_{1-3}$ alcohol or a combination of a $C_{1-3}$ alcohol and water at an elevated temperature of 60 to 65° C. in the presence of an alkali catalyst to form a first admixture.

42. The process of claim 41 wherein the $C_{1-3}$ alcohol is ethanol and a majority of the ethanol is recycled ethanol recovered from the process.

43. The process of claim 42 further comprising the steps of (i) adjusting the pH of the first admixture below 6 by the addition of an acid after saponification of the oil, and (ii) recovering a free fatty acid enriched fraction and a glycerine enriched fraction from the pH adjusted first admixture wherein the recovered free fatty acid enriched fraction is the source of free fatty acids complexed with urea in step (b).

44. The process of claim 40 wherein the alkyl esters are ethyl esters.

45. The process of claim 31 wherein the blend of long chain saturated and unsaturated fatty acid alkyl esters is selected from the group consisting of transesterified plant oils, animal oils, fish oils and marine mammal oils.

\* \* \* \* \*